US012582851B2

(12) United States Patent
Price

(10) Patent No.: US 12,582,851 B2
(45) Date of Patent: Mar. 24, 2026

(54) FILTER ELEMENT FOR BREATHING APPARATUS, FILTER DEVICE, BREATHING APPARATUS, AND USE OF FILTER ELEMENT

(71) Applicant: MANN+HUMMEL Life Sciences & Environment Holding Singapore Pte. Ltd., Singapore (SG)

(72) Inventor: Andrew Price, Ennepetal (DE)

(73) Assignee: MANN+HUMMEL Life Sciences & Environment Holding Singapore Pte. Ltd., Singapore (SG)

( * ) Notice: Subject to any disclaimer, the term of this patent is extended or adjusted under 35 U.S.C. 154(b) by 658 days.

(21) Appl. No.: 18/076,394

(22) Filed: Dec. 7, 2022

(65) Prior Publication Data

US 2023/0241426 A1 Aug. 3, 2023

(30) Foreign Application Priority Data

Jan. 28, 2022 (EP) .................................... 22154025

(51) Int. Cl.
*A62B 23/02* (2006.01)
*A62B 9/04* (2006.01)

(52) U.S. Cl.
CPC ................ *A62B 23/02* (2013.01); *A62B 9/04* (2013.01)

(58) Field of Classification Search
CPC ......... A62B 23/00; A62B 23/02; A62B 18/02; A62B 18/025; A62B 9/04; A62B 7/10; A62B 19/00
See application file for complete search history.

(56) References Cited

U.S. PATENT DOCUMENTS

| | | | | |
|---|---|---|---|---|
| 6,435,184 | B1 | 8/2002 | Ho | |
| 10,835,704 | B1 | 11/2020 | Heimbuch et al. | |
| 2009/0211581 | A1 | 8/2009 | Bansal | |
| 2011/0308524 | A1* | 12/2011 | Brey ...................... | A62B 23/02 128/205.12 |
| 2015/0107596 | A1 | 4/2015 | Mashiko | |
| 2018/0154193 | A1* | 6/2018 | Stinzendoerfer .. | B01D 53/0415 |
| 2021/0331007 | A1* | 10/2021 | Cresswell .............. | B01D 46/52 |

FOREIGN PATENT DOCUMENTS

| | | | |
|---|---|---|---|
| BE | 403848 | A | 6/1934 |
| CN | 111135492 | A | 5/2020 |
| CN | 111135495 | A | 5/2020 |
| CN | 111840845 | A | 10/2020 |

(Continued)

OTHER PUBLICATIONS

English Machine Translation of KR 20200052217 A provided by Espacenet (Year: 2020).*

(Continued)

*Primary Examiner* — Joseph D. Boecker
*Assistant Examiner* — Brian T Khong

(57) ABSTRACT

A filter element for a breathing apparatus comprises a pleated filter medium forming a ring having a noncircular shape. The ring encloses an interior volume, and the interior volume of the ring is adapted to accommodate a further filter element. A removable filter device comprises a housing adapted to couple to the breathing apparatus, and the housing includes the filter element and the further filter element arranged in the interior volume of the ring.

12 Claims, 5 Drawing Sheets

(56) References Cited

FOREIGN PATENT DOCUMENTS

| | | | | | |
|---|---|---|---|---|---|
| CN | 212439767 | U | | 2/2021 | |
| CN | 212817684 | U | | 3/2021 | |
| DE | 202020103849 | U1 | | 7/2020 | |
| FR | 757596 | A | | 12/1933 | |
| GB | 215326 | A | | 12/1924 | |
| KR | 20200052217 | A | * | 5/2020 | ......... B01D 46/4227 |
| KR | 20200052218 | A | | 5/2020 | |
| KR | 102152341 | B1 | * | 9/2020 | ........... A62B 18/025 |

OTHER PUBLICATIONS

English Machine Translation of KR-102152341-B1 provided by PE2E (Year: 2020).*

Office Action in corresponding European Patent Appln. No. 22154025.5, 2025-01-29, 10 pages, European Patent Office.

* cited by examiner

FILTER ELEMENT FOR BREATHING APPARATUS, FILTER DEVICE, BREATHING APPARATUS, AND USE OF FILTER ELEMENT

CROSS-REFERENCE TO RELATED APPLICATION

This application claims the benefit under 35 U.S.C. 119(a) of European Application No. 22154025.5 filed on Jan. 28, 2022, in the European Patent Office, the entire disclosure of which is incorporated herein by reference for all purposes.

TECHNICAL FIELD

Embodiments relate to a filter element that is suitable for use in a breathing apparatus, such as a protective mask, wherein the filter element is, in particular, a replaceable filter element. Further, breathing apparatuses and devices relating to particle filtration are disclosed as well as specific uses of the filter element.

BACKGROUND ART

DE 20 2020 103 849 U1 discloses a protective mask with a main body that covers a mouth and nose of a user. The mask comprises a replaceable filter element to be screwed into a fitting of the main body. The filter element including a sequence of filter components in a cylindrically shaped housing. The filter components are circular flat elements, that are implemented to withhold particles from the filtered air. In order to improve the filter efficiency, the number of sequential filter components can be varied. Thus, a thickness and volume of the stacked filter components in the attachable filter element increases with an increased filtering efficiency.

SUMMARY

Against this background, it is one object of the embodiments to provide an improved filter element, filter device and/or breathing apparatus.

Accordingly, a filter element for a breathing apparatus is disclosed. The filter element comprises a pleated filter medium forming a ring having a noncircular shape, wherein the ring encloses an interior volume. The interior volume of the ring is adapted to accommodate a further filter element.

The folded filter medium can be considered an (endless) bellows, and may have flat end caps placed on the edges of the pleats of the filter medium. The bellows, in particular forms a ring having a noncircular shape, such as an oval shape.

It is an advantage that a further second filter element may be placed within the interior volume of the ring. In use, an air flow through the filter element may be radially implemented. If the pleated filter medium forms a ring, a second filter element, e.g. an adsorptive filter, can be placed within the ring of the filter medium, thereby reducing the volume of the entire filter element.

In embodiments, a circumferential direction of the ring comprises at least two sections having different curvatures. For example, along its circumferential direction, the ring includes at least two half-circular sections and two straight sections thereby forming a stadium-like geometry. One may contemplate other configurations of a ring having a noncircular shape and sections of different curvatures. In particular, in sections, where the pleated filter medium runs along a straight line, the density of the pleats along the circumferential direction may be higher than in sections with a higher curvature. Thus, a noncircular shape may increase the effective filtering surface.

In embodiments, the filter medium is adapted to filter particles from a gaseous medium. The filter medium may comprise a nonwoven synthetic fiber material. In embodiments, the filter medium comprises synthetic fibers, glass fibers and in particular one or more materials of the group of ePTFE, PET, PP and PE.

In embodiments, the filter element is implemented to fulfill suitable classes of filter efficiency according to regulatory standards applicable for respiratory protective equipment. Exemplary regulatory standards include DIN EN140, DIN EN143, DIN EN149, DIN EN405, DIN EN1827, DIN EN14387, DIN EN12941, DIN EN12942, ISO17420 and NIOSH 42CFR Part 84 at the time of filing this application. In embodiments, the filter element is implemented to fulfill a class FFP1, class FFP2 or class FFP3 particulate filter rating according to DIN EN149 standard at the time of filing of this application. In embodiments, the filter element is implemented to fulfil a class P1, class P2 or class P3 particulate filter rating according to DIN EN143 standard at the time of filing of this application.

According to another aspect of this application, a removable filter device is disclosed comprising a housing adapted to couple to a breathing apparatus and, within the housing, a first filter element according to the embodiments disclosed above and below in this disclosure, and a second filter element arranged in the interior volume of the ring of the first filter element. A removable filter element can be considered a cartridge to be attached or inserted into a breathing apparatus.

In embodiments, the filter device includes a second filter element comprising an adsorbent filter medium. The adsorbent filter medium may be a foamed material comprising an activated carbon material.

In embodiments, the combination of the first and the second filter element fulfills an A2P3-R rating according to at least one of the following norms: DIN EN 14387, DIN EN 140, DIN EN 143, DIN EN 405, DGUV-109-013, DGUV-209-014, and DGUV-112-190 at the time of fling this application.

In embodiments, the filter device comprises a housing with a base portion and a cap portion attached to the base portion. The first filter element is accommodated between the base portion and the cap portion. Due to the ring-shaped arrangement and the accommodation of the second filter element within the interior volume of the first filter element, a low height of the filter device can be achieved. The filter device may have cylindrical shape with a non-circular base geometry.

In embodiments of the filter device, the base portion and/or the cap portion comprise a ring-shaped protruding wall extending into the interior volume of the first filter element. The ring-shaped protruding wall can be used as accommodation for the second filter element. In embodiments, the ring-shaped protruding wall has a closed section and a section having openings for air to be filtered.

In embodiments, the base portion comprises an outlet and a coupling device adapted to couple to a corresponding coupling device of a breathing apparatus. A coupling mechanism may be a bayonet coupling, screw joint or a snap-fit coupling.

According to a further aspect of this disclosure, a breathing apparatus comprising a coupling mechanism and a filter device as disclosed above or below is presented. The coupling mechanisms correspond to each other, so that the filter device is securely placed within the breathing apparatus. The breathing apparatus is, for example, a half mask, a full-face respirator or a powered air-purifying respirator (PAPR).

In embodiments, the breathing apparatus may comprise a device body and an attachable cover element having a coupling mechanism adapted to couple to the device body. For example, the cover element is adapted to press the filter device, in particular, axially along an ingoing air flow direction, towards the device body. The device body, for example, covers the mouth and nose of a user and has one or more openings for replaceable filter elements. The device bod and the cover element may form a compartment for the filter device.

In embodiments, between the attachable cover element and the inlet opening in the device body, a sequence of filter media or filter components can be arranged.

In embodiments, the breathing apparatus comprises a pre-filter pad arranged along the air-flow direction between an inlet opening of the cover element and the cap portion.

In embodiments, a breathing apparatus may further comprise a post-filter pad arranged on the outgoing air-flow direction after the second filter element within the interior volume of the first filter element.

In embodiments, the breathing apparatus fulfills the above-mentioned norms and standards at the time of filing of this application.

Finally, the use of the filter element according to the above embodiments or the below further elaborated examples in a breathing apparatus is proposed.

The above aspects and features of the filter element, filter device and breathing apparatus may realize one or more of the following advantages. The pleated filter medium having a ring-shaped geometry and the adsorptive filter element may be easily replaced independently of other elements in the breathing apparatus. The filter element may be implemented as a cartridge having a low cartridge depth or height, for example less than 5 cm, preferably less than 4 cm. The irregular ring shape of the first filter element increases the filter area and reduces the overall volume of the filter element by accommodating the second filter element in the interior volume. One may contemplate of using the disclosed filter element in a half mask providing clean air for breathing.

Further possible implementations or alternative solutions of the embodiments also encompass combinations—that are not explicitly mentioned herein—of features described above or below with regard to the embodiments. The person skilled in the art may also add individual or isolated aspects and features to the most basic form of the embodiments.

BRIEF DESCRIPTION OF THE DRAWINGS

Further embodiments, features and advantages will become apparent from the subsequent description and dependent claims, taken in conjunction with the accompanying drawings, in which:

In the figures, like reference numerals designate like or functionally equivalent elements, unless otherwise indicated.

DETAILED DESCRIPTION

Figure 1:
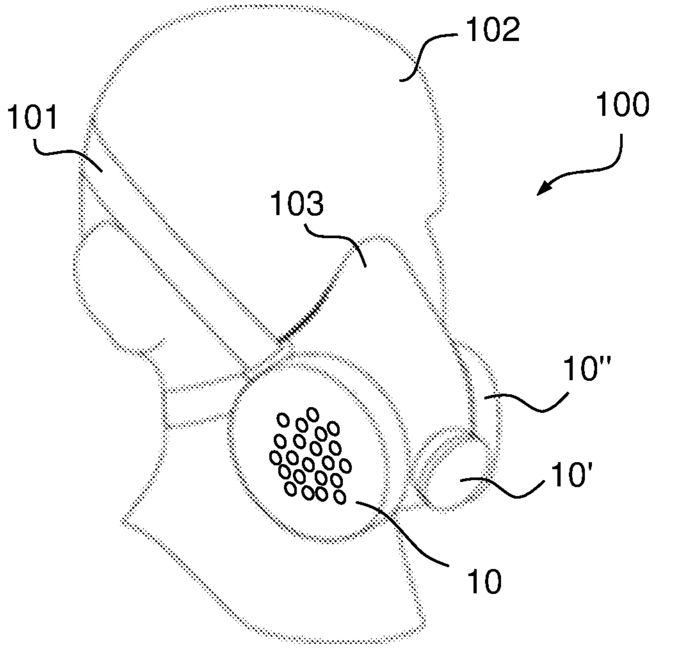
FIG. 1 shows a schematic view of one embodiment of a breathing apparatus.

FIG. 1 shows a schematic view of one embodiment of a breathing apparatus implemented as a half mask, for example providing a user with clean air for breathing during operations in contaminated atmospheres. The half mask device 100 includes a main body 103 covering the mouth and the nose of the user 102. Head straps 101 press the main body 103 against the face of the user 102 so that no contaminated gas can enter the interior of the mask 100. The half mask 100 has one or more filter devices 10, 10', 10" implemented to filter particles and/or hazardous gases from the atmosphere. The filter devices 10, 10', 10" may include filter elements for various purposes. For example, for parts of the mask 100 configured as inlets, such as where devices 10 and 10" are located, devices 10 and 10" may be combination filters including particle filter elements, e.g. fulfilling FFP2 or FFP3 ratings, and adsorptive filter media, such as a filter medium including an activated carbon material. For parts of the mask 100 configured as outlets, such as where device 10' is located, device 10' may include any appropriate filter element. Where mask 100 includes only one filter device, the filter device may be combination filters including particle filter elements, e.g. fulfilling FFP2 or FFP3 ratings, and adsorptive filter media, such as a filter medium including an activated carbon material.

FIGS. 2 through 8 describe aspects of an embodiment of a filter device including a filter element suitable for use in a breathing apparatus, for example the protective half mask shown in FIG. 1.

Figure 2:
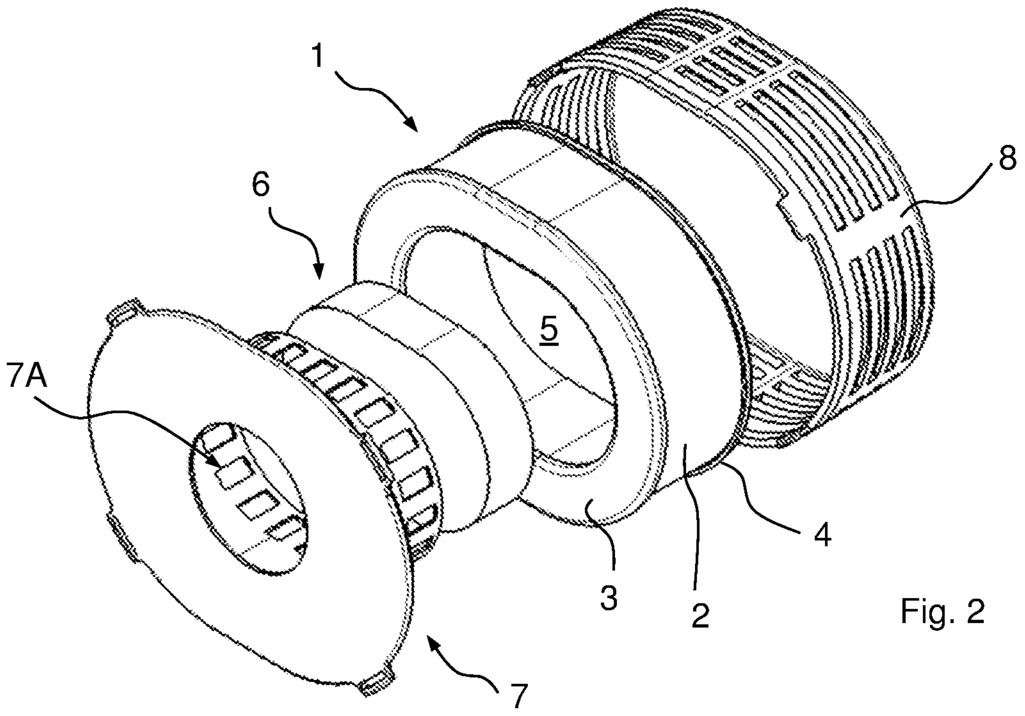
FIG. 2 shows a perspective view of an embodiment of a filter device including an embodiment of a filter element for use in a breathing apparatus according to FIG. 1.
Figure 3:
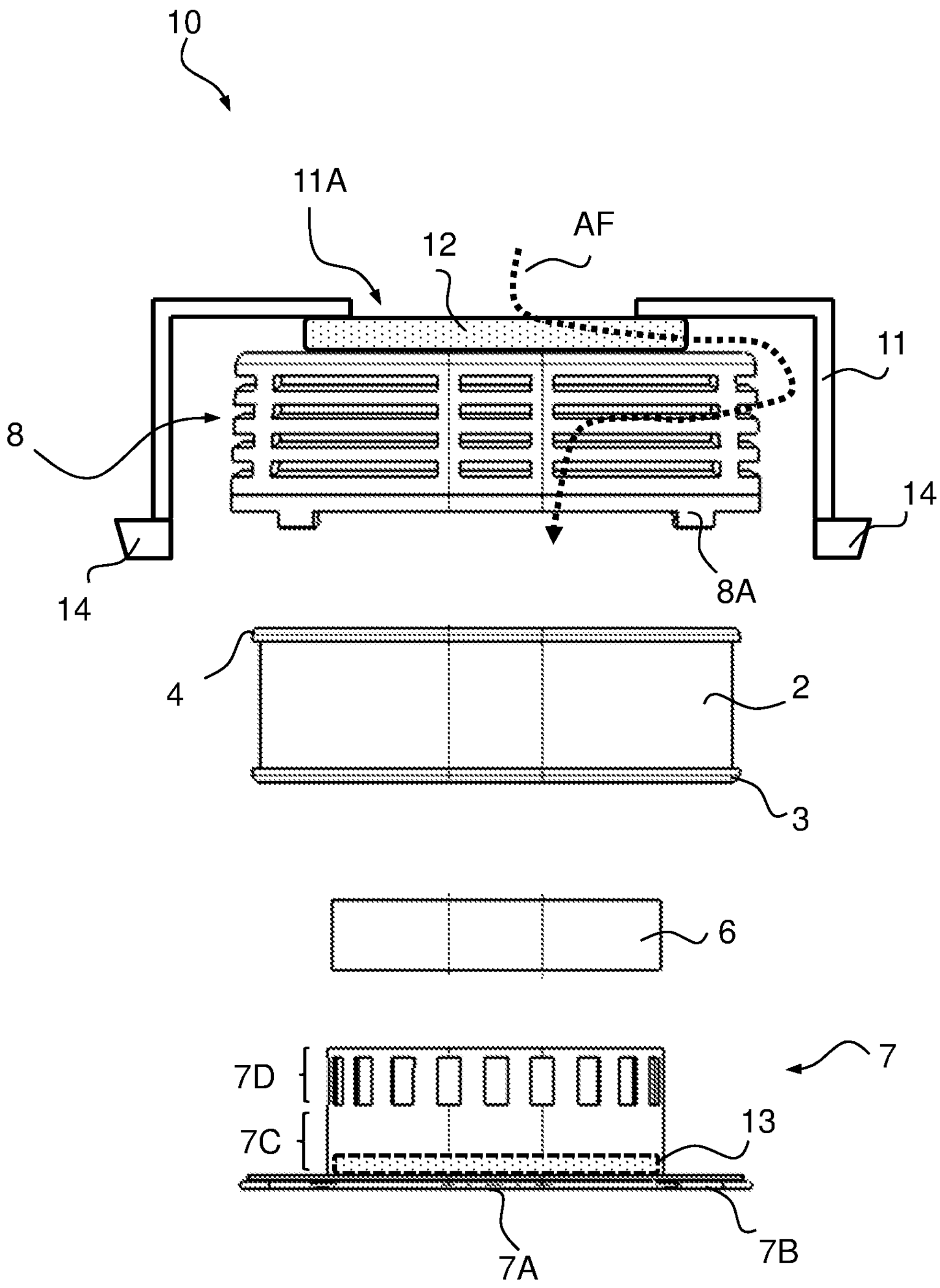
FIG. 3 shows a cross-sectional view of the filter device according to FIG. 2 in an embodiment of a breathing apparatus.

FIG. 2 shows an exploded three-dimensional view of an embodiment of a filter device 10. FIG. 3 shows a cross-sectional view of the filter device 10 within a schematically drawn breathing apparatus.

Figure 7A:
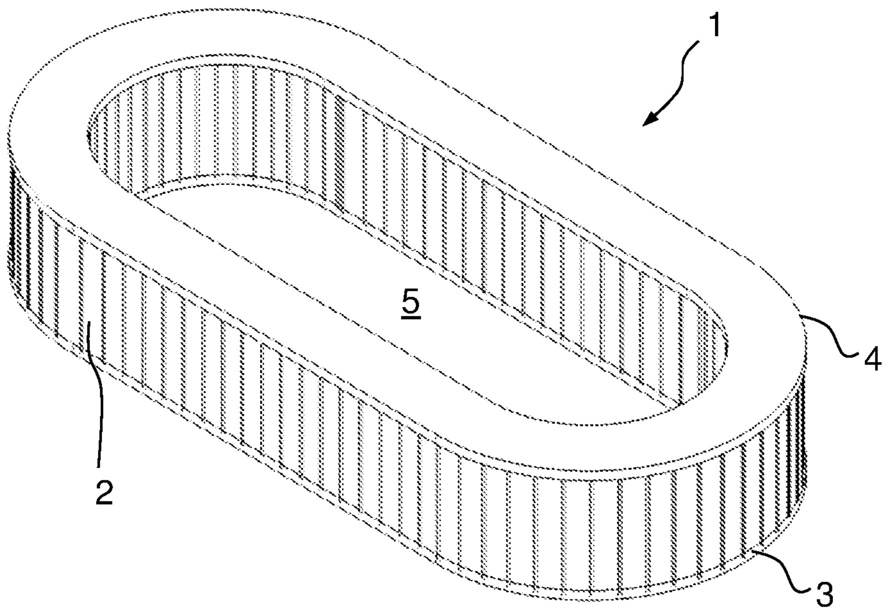
FIG. 7*a* shows a perspective view of a pleated filter medium in an embodiment of a filter element according to FIG. 2.

The filter device 10 includes a ring-shaped filter element 1 with a pleated filter medium 2 forming a bellows. The bellows 2 is placed between end caps 3, 4 of the filter element 1 as also depicted in FIG. 7*a*. The ring 9 has a non-circular shape with an interior 5 as depicted in FIG. 7*a* and further depicted in FIG. 7*b* below.

The interior 5 is adapted to accommodate a second filter element 6 which is implemented as an absorptive filter element. The combination of the absorptive filter element 6 and the ring-shaped particle filter element 1 is arranged between a base portion 7 and a cap portion 8 of the housing of the filter device 10. The housing of the two filter elements 1, 6 can be considered a filter cartridge that is replaceable within the breathing apparatus.

As shown in FIG. 3, the base portion has an opening 7A to communicatively couple with the breathing apparatus and the wall protruding from the base plate 7B has a closed section 7C and a section with openings 7D. The cap portion includes openings 8B.

In use, the filter device 10 is attached to the breathing apparatus with a cover 11. The cover 11 may be formed by a compressive or flexible material and includes a coupling mechanism 14, e.g. a bayonet connection point or a snap-fit connection to couple to, for example, the device body 103 shown in FIG. 1. The cover element 11 may preferably be formed by a TPU material. The cover 11 includes an inlet opening 11A into which a pre-filter pad 12 is inserted or held at the closed lid 8C of the cap portion 8. Alternatively, cap portion 8 may include coupling mechanism 14 to couple to, for example, the device body 103 shown in FIG. 1, thereby negating the need for cover 11.

Further, a post-filter pad 13 can be placed in the interior of the ring-shaped protruding wall 7C, 7D of the base plate 7 together with the second filter element 6. When the filter device 10 is assembled, the cover 11 presses the axial arrangement of the pre-filter pad 12, the cap portion 8, the particle filter element 2, the absorbend filter element 6, the post-filter element 13 and the base portion 7 towards a not shown breathing device.

The air flow occurs along the dotted arrow AF through the pre-filter pad 12, the openings in the cap portion 8, the pleated filter medium 2, the adsorbend filter 6 and the post-filter pad 13 and is then guided towards the user through the opening 7A.

Figure 4:
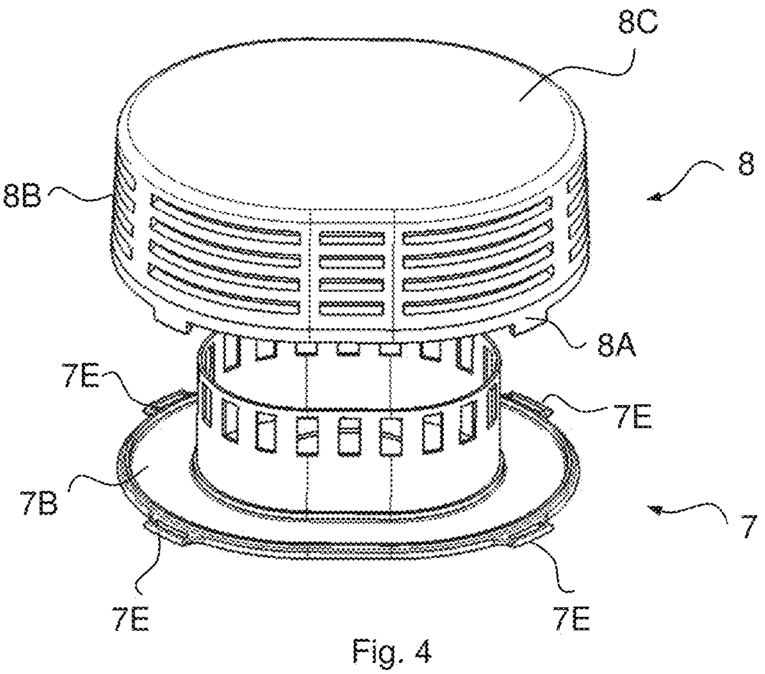
FIG. 4-6 show a perspective view of details of the housing elements in the filter device according to FIG. 2.
Figure 5:
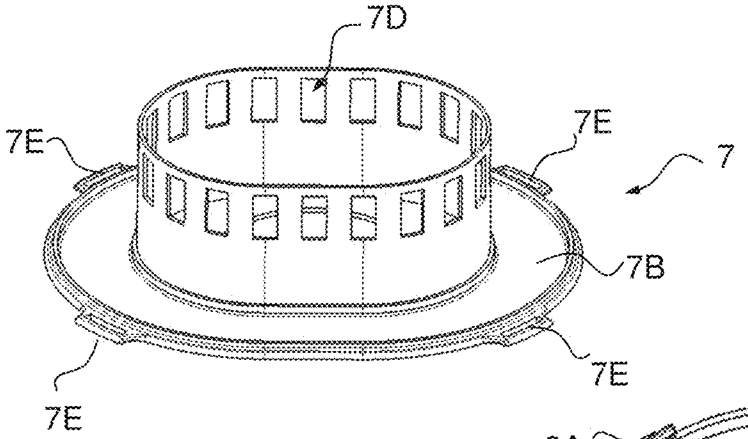
Figure 6:
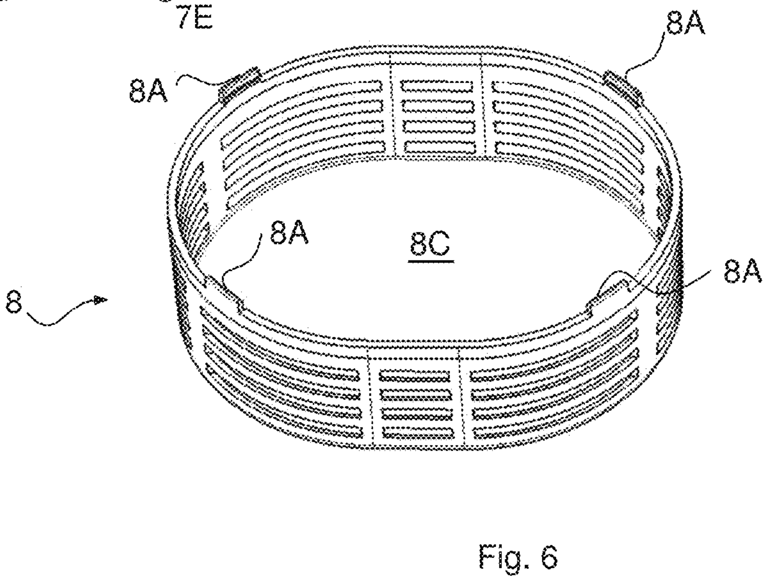

FIGS. 4-6 show more details of the filter-device housing, which, in embodiments, consists only of the base portion 7 and the cap portion 8. The base and cap portion 7, 8 may be produced by injection molding of a plastic material. One may contemplate of plastic materials such as PE, for example but not limited to high density polyethylene; PP; polyamide, for example but not limited to PA6; or polyurethane materials, for example but not limited to two component polyurethanes. In the embodiment shown in FIGS. 4 though 6, the base plate 7 includes radially extending snap-in portions 7E for snap arms 8A, that are axially arranged at the cap portion 8. The cap portion 8 has a closed cap wall or lid 8C and a lateral wall with an opening section 8B. The coupling mechanism between the base plate 7B and the cap wall 8B is realized through a snap-fit by the elements 7E and 8A. Alternatively, end cap 3 of the filter element 1 may include snap arms that couple with the radially extending snap-in portions 7E of base plate 7, thereby negating the need for cap portion 8. Cap portion 8 may be omitted when the applicable regulatory standard does not require splash protection against fluids, such as blood and water, and/or spark protection.

Figure 7B:
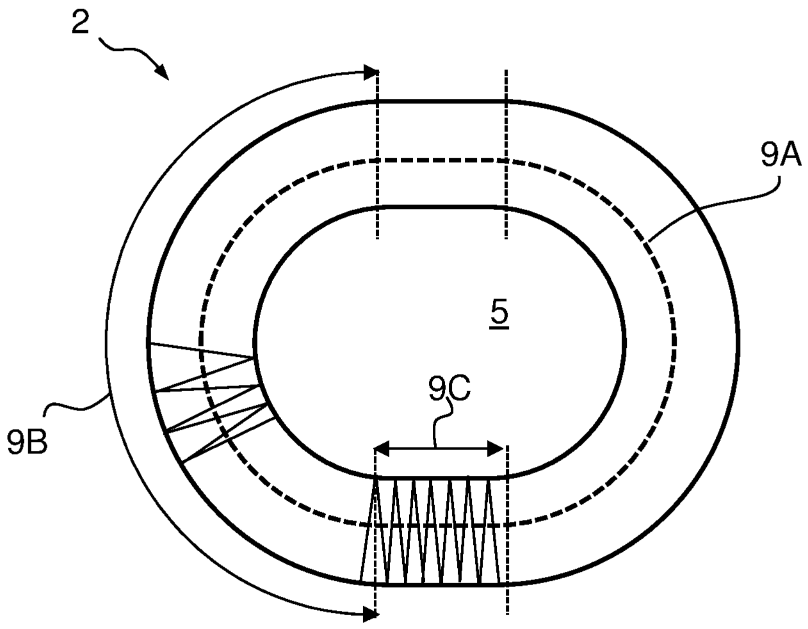
FIG. 7*b*-7*c* show schematic views of a pleated filter medium in an embodiment of a filter element according to FIG. 2.
Figure 7C:
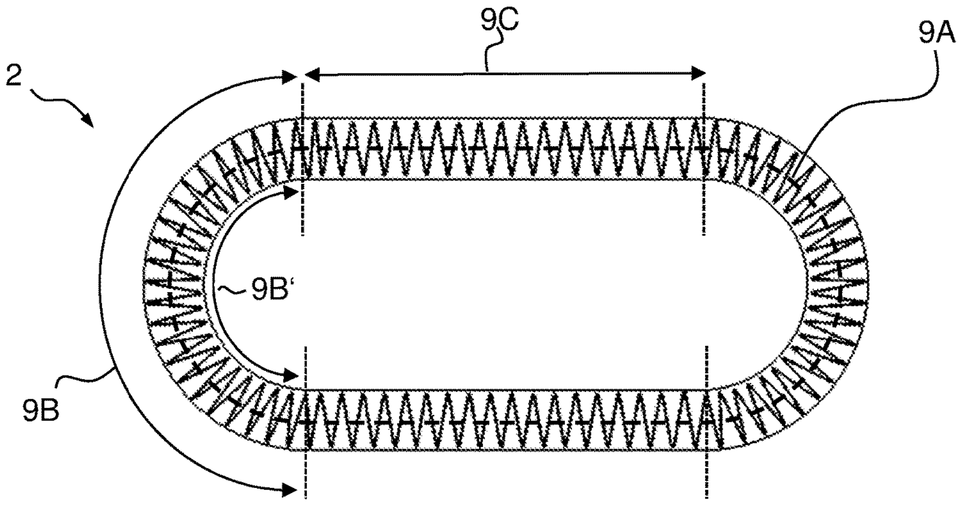

FIG. 7*b* and FIG. 7*c* show plan views illustrating a pleated filter medium 2 having a ring shape. The circumferential direction of the ring-shaped pleated filter medium 2 forming a bellows is indicated as a dashed line 9A. The embodiment shown in FIGS. 7*a* to 7*c* has a stadium-like shape with two straight sections 9C and two circular sections 9B, as depicted in more detail in FIG. 7*b* and FIG. 7*c*. In FIG. 7*b*, the pleats of the pleated filter medium 2 are partially shown in the lower straight section 9C and the left circular section 9B. The density of the pleats may be uniform throughout the ring, as depicted in FIG. 7*c*. Due to the circular section 9B having a high(er) curvature, the pleats may be more compressed along the inner circumference 9B'. The pleats are not, or less, compressed along the straight sections 9C. Alternatively, to increase the surface area in the straight sections, more pleats may be provided in the straight sections than in the circular sections having a high(er) curvature, as depicted in FIG. 7*b*. Thus, implementing the non-circular shape of the filter medium with pleats in any configuration as mentioned above leads to a higher surface area of the filter. In the interior 5 of the ring-shaped filter medium 2, in particular an addition adsorptive filter element may be be placed.

Figure 8:
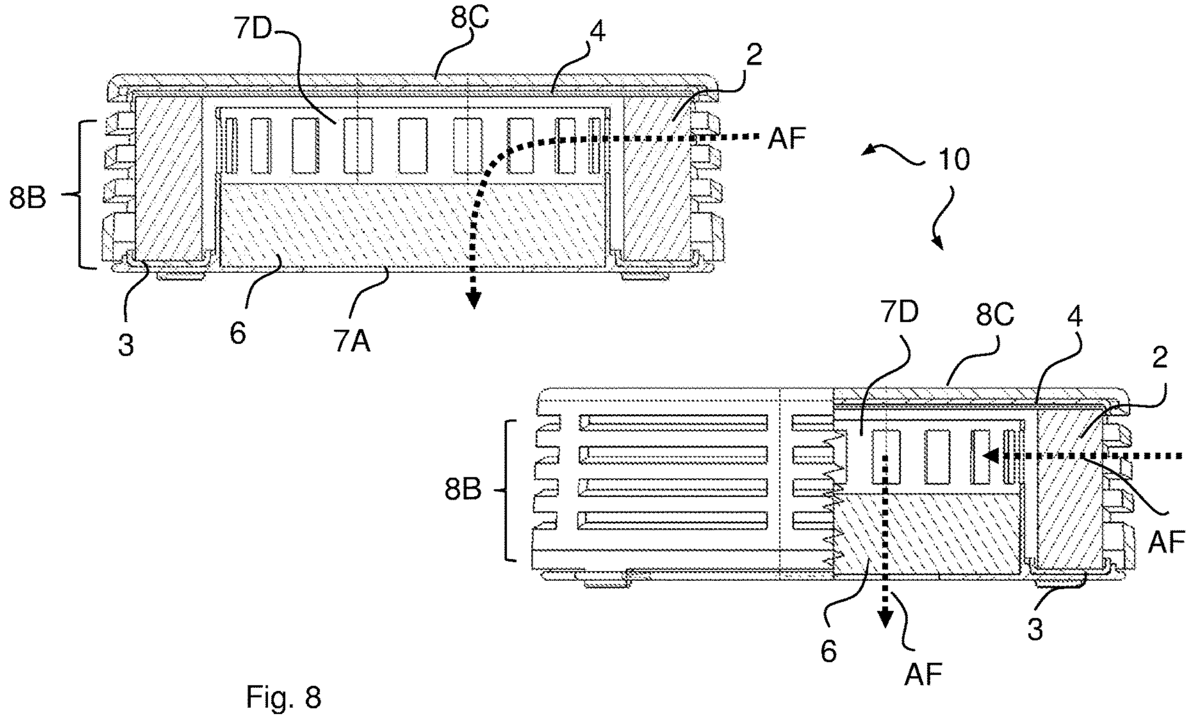
FIG. 8 shows further cross-sectional views of the filter device according to FIG. 2.

FIG. 8 shows cross-sectional views of the assembled filter device 10. In FIG. 8, dotted arrows AF show the air flow. In use, external, potentially contaminated, air flows through the openings 8B of the cap portion 8 and passes through the pleats of the filter medium 2 in a radial direction. The cleaned air passing through the filter medium 2 runs through the openings 7D of the ring-shaped protruding wall 7D of the base portion 7 and enters the interior 5 of the ring-shaped pleated filter medium 2. In the next filtering step, the air flows through the adsorptive filter element 6 in an axial direction. The cleaned air passes through the opening 7A in the base plate 7B, i.e. through the outlet opening 7A either to the user or a further optional filter pad.

The pleated filter medium 2 is placed between a closed (upper) end cap 4 and a (lower) end cap 3 with an opening.

The disclosed filter element, filter device and breathing apparatus provide for flexible devices for air filtering occupying a reduced space. The ring-shaped exchangeable particle-filter element allows for an efficient accommodation of a second adsorptive filter element. The disclosed filter elements and filter devices are in particular used in breathing apparatuses, such as protective masks with replaceable filter elements.

By adapting the used filter media, one may obtain filter devices according to various standards such as DIN EN 14387, DIN EN 140, DIN EN 143, DIN EN 405.

In particular, the exchangeable parts of the disclosed filter cartridges comprise only few material components. A coupling of the filter device or filter cartridge including at least the two filter elements to the breathing apparatus may be realized by various coupling means, e.g. defined by the breathing apparatus.

A use of the disclosed filter elements and devices including endless bellows of pleated filter media in breathing apparatuses can advantageously render the apparatuses smaller and more flexible.

REFERENCE NUMBERS

1 filter element
2 filter medium
3, 4 end plate
5 interior volume
6 filter element
7 base portion
7A opening/outlet
7B base plate
7C/7D protrusion
7E snap in portion
8 cap portion
8A snap arm
8B opening section/inlet section
8C cap wall
9 ring
9A circumferential direction
9B circular section
9B' inner circumference of circular section
9C straight section
10, 10', 10" filter device
11 cover element
11A opening/inlet
12 pre-filter pad
13 post-filter pad
14 coupling device

100 breathing apparatus
101 head strap
102 head
103 device body
AF air flow

The invention claimed is:

1. A breathing apparatus comprising:
a removable filter device comprising:
a filter element comprising:
a pleated filter medium forming a ring having a non-circular shape, the ring enclosing an interior volume; and
a further filter element arranged in the interior volume enclosed by the ring;
a device body; and
an attachable cover element comprising a coupling mechanism adapted to couple to the device body and to press the filter device axially towards the device body;
wherein the removable filter device further comprises a base portion and a cap portion that is attached to the base portion, the filter element being accommodated between the base portion and the cap portion.

2. The breathing apparatus according to claim 1, wherein, along a circumferential direction of the ring, the ring comprises at least two sections having different curvatures.

3. The breathing apparatus according to claim 1, wherein, along a circumferential direction of the ring, the ring comprises at least two half-circular sections and two straight sections.

4. The breathing apparatus according to claim 1, wherein the pleated filter medium is adapted to filter particles from a gaseous medium.

5. The breathing apparatus according to claim 1, wherein the filter element is adapted to fulfill a class P2 or class P3 particulate filter rating according to the EN 149 standard.

6. The breathing apparatus according to claim 1, wherein the further filter element comprises a foam material comprising an activated carbon material.

7. The breathing apparatus according to claim 1, wherein the base portion and/or the cap portion comprises a ring-shaped protruding wall extending into the interior volume of the filter element.

8. The breathing apparatus according to claim 1, further comprising:
a pre-filter pad arranged along an air flow direction between an inlet opening of the attachable cover element and the cap portion; and/or
a post-filter pad arranged along an outgoing air flow direction after the further filter element.

9. The breathing apparatus according to claim 1, wherein the breathing apparatus is a half mask, a full-face respirator, or a powered air purifying respirator.

10. The breathing apparatus according to claim 1, wherein the cap portion comprises a closed lid and a lateral wall with openings.

11. The breathing apparatus according to claim 10, wherein the base portion comprises a base plate and a wall protruding from the base plate, wherein the protruding wall comprises openings and the further filter element is placed in the interior of the protruding wall.

12. The breathing apparatus according to claim 11, wherein the lateral wall with openings couples with the base plate to attach the base portion to the cap portion, such that external air flows through the lateral wall with openings, passes through the pleated filter medium in a radial direction, cleaned air from the pleated filter medium runs through the openings of the protruding wall, flows through the further filter element and exits the further filter element in an axial direction.

* * * * *